United States Patent
Walzel

(10) Patent No.: US 10,931,218 B2
(45) Date of Patent: Feb. 23, 2021

(54) VACUUM PUMP DRIVE WITH STAR-DELTA SWITCHOVER

(71) Applicant: Leybold GmbH, Köln (DE)

(72) Inventor: Sebastian Walzel, Unna (DE)

(73) Assignee: LEYBOLD GMBH, Cologne (DE)

( * ) Notice: Subject to any disclaimer, the term of this patent is extended or adjusted under 35 U.S.C. 154(b) by 185 days.

(21) Appl. No.: 16/063,896

(22) PCT Filed: Jan. 6, 2017

(86) PCT No.: PCT/EP2017/050255
§ 371 (c)(1),
(2) Date: Jun. 19, 2018

(87) PCT Pub. No.: WO2017/118723
PCT Pub. Date: Jul. 13, 2017

(65) Prior Publication Data
US 2018/0367082 A1    Dec. 20, 2018

(30) Foreign Application Priority Data

Jan. 7, 2016 (DE) .......................... 102016200112.4

(51) Int. Cl.
*H02P 23/00* (2016.01)
*H02P 1/32* (2006.01)
(Continued)

(52) U.S. Cl.
CPC .............. *H02P 23/00* (2013.01); *H02K 11/21* (2016.01); *H02K 11/25* (2016.01); *H02K 11/33* (2016.01);
(Continued)

(58) Field of Classification Search
CPC ...... F04C 29/0085; H02K 7/003; H02K 7/14; H02K 11/00; H02K 11/0094; H02K 11/20;
(Continued)

(56) References Cited

U.S. PATENT DOCUMENTS 5,697,763 A * 12/1997 Kitchener ............... F04C 28/06
417/28
6,416,290 B1    7/2002 Yamauchi
(Continued)

FOREIGN PATENT DOCUMENTS

DE    102007020706 A1    11/2008
DE    102013009036 A1    12/2014
(Continued)

OTHER PUBLICATIONS

Gardner Denver; "Publication Frequency Converters"; www.gd-elmorietschle.com; 2007; pp. 1-96.
(Continued)

*Primary Examiner* — Patrick Hamo
*Assistant Examiner* — Joseph S. Herrmann
(74) *Attorney, Agent, or Firm* — Ohlandt, Greeley, Ruggiero and Perle, LLP

(57) ABSTRACT

A vacuum pump drive comprising at least one electric motor which is connected to the rotor of a vacuum pump via a drive shaft, a frequency converter which is electrically connected to the motor and which supplies a motor input voltage to the motor, and a switchover device with at least one electric switch. The switchover device is designed to connect the motor windings in a star or delta shape depending on the switching position of the switch in order to change the motor characteristic curve. The vacuum pump drive also comprises a measuring device with sensors for detecting physical operating variables of the vacuum pump and a controller (Continued)

which is electrically or optically connected to the switchover device and the measuring device and which is designed to actuate the at least one switch on the basis of the measured value of the operating variable of the vacuum pump in order to produce the star-delta switchover.

4 Claims, 1 Drawing Sheet

(51) Int. Cl.
*H02K 11/21* (2016.01)
*H02K 11/25* (2016.01)
*H02K 11/33* (2016.01)
*H02P 27/04* (2016.01)
*F04C 29/00* (2006.01)

(52) U.S. Cl.
CPC ............... *H02P 1/32* (2013.01); *H02P 27/04* (2013.01); *F04C 29/0085* (2013.01); *H02P 2207/01* (2013.01)

(58) Field of Classification Search
CPC ...... H02K 11/21; H02K 11/215; H02K 11/22; H02K 11/225; H02K 11/25; H02K 11/30; H02K 11/33; H02P 1/32; H02P 23/00; H02P 27/04; H02P 29/60; H02P 2207/01; H02P 25/184
See application file for complete search history.

(56) References Cited

U.S. PATENT DOCUMENTS

| | | | |
|---|---|---|---|
| 6,739,840 B2* | 5/2004 | Curry | F04D 19/04 417/326 |
| 7,245,097 B2* | 7/2007 | Someya | H02P 1/28 318/400.22 |
| 9,252,698 B2* | 2/2016 | Kume | H02P 25/188 |
| 2004/0195994 A1 | 10/2004 | Kume et al. | |
| 2008/0080982 A1* | 4/2008 | Tanigawa | F04C 18/126 417/46 |
| 2010/0047080 A1* | 2/2010 | Bruce | F04B 49/06 417/45 |
| 2016/0076630 A1 | 3/2016 | Hehenberger | |
| 2018/0105423 A1 | 4/2018 | Inoue | |

FOREIGN PATENT DOCUMENTS

| | | |
|---|---|---|
| DE | 102013221342 A1 | 4/2015 |
| EP | 1515423 A2 | 3/2005 |
| EP | 1515423 A3 | 2/2006 |
| JP | H053694 | 1/1993 |
| JP | H10266991 | 10/1998 |
| JP | 2015044715 | 3/2015 |
| JP | 2015061372 | 3/2015 |
| WO | 2008135532 A1 | 11/2008 |
| WO | 2014183142 A1 | 11/2014 |

OTHER PUBLICATIONS

Japanese Office Action in corresponding application No. JP 2018535168 dated Nov. 10, 2020.

* cited by examiner

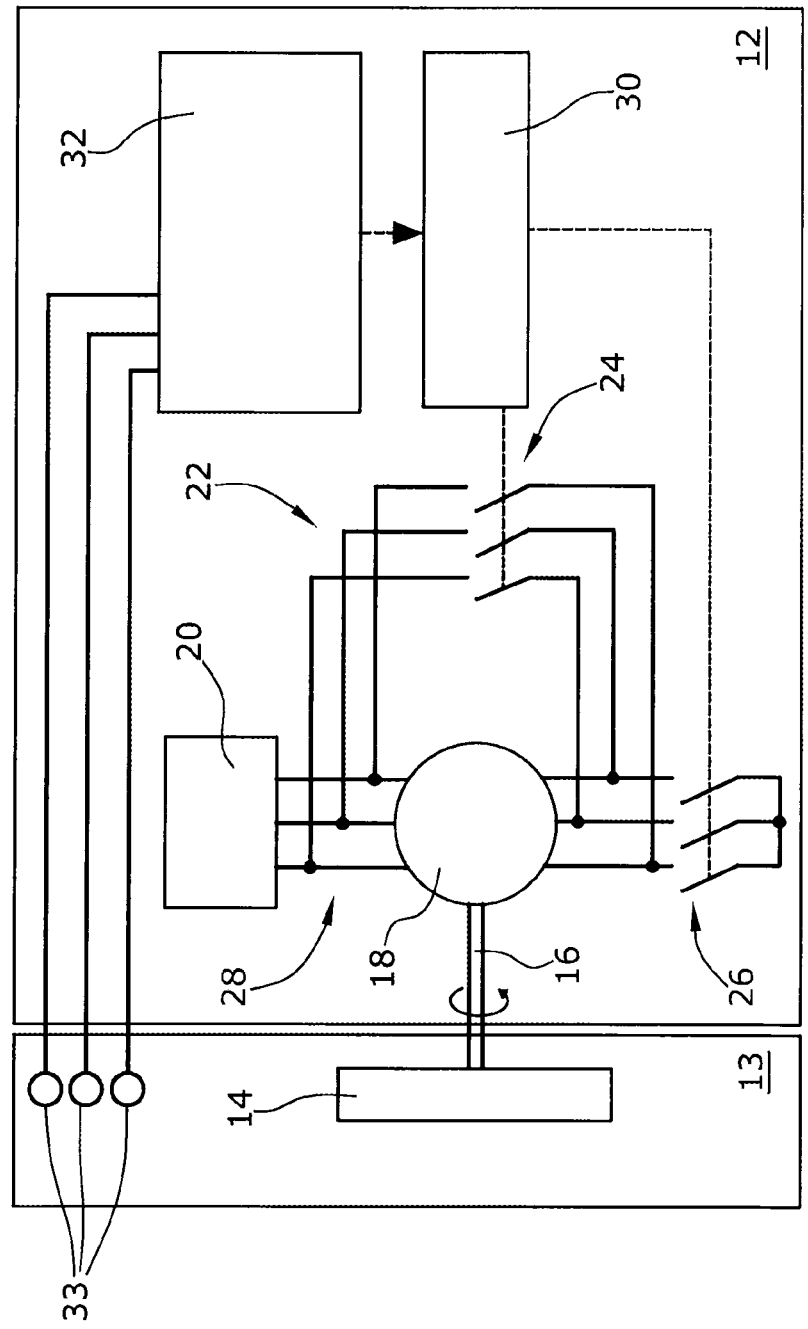

VACUUM PUMP DRIVE WITH STAR-DELTA SWITCHOVER

BACKGROUND

1. Field of the Disclosure

The disclosure relates to a device and a method for driving a vacuum pump.

2. Discussion of the Background Art

Vacuum pumps are typically designed as rotary vacuum pumps with a pump stator and a pump rotor. A rotation of the pump rotor with respect to the pump stator causes a change in pressure. The pump rotor is driven by an electric motor via a drive shaft.

For example, it is known from US 2004/0195994 A1 to connect the motor windings of the electric motor in a star or a delta shape in order to change the motor characteristic and thereby the available torque of the motor. Thus it becomes possible to provide a higher torque at a lower rotational speed. It is a particularity of this variant that each of the two characteristics is operated only in one operating point so that the motor can be operated only in two different operating points.

Instead of being able to operate the electric motor of a vacuum pump drive only in two different operating points, it has become common practice to control the electric motors by means of a frequency converter. In a DC intermediate circuit, the frequency converter first generates a direct voltage from an alternating voltage of a power supply network, from which direct voltage a synthetic alternating voltage of variable frequency is then generated as the motor input voltage. Here, the rotational speed of the motor depends on the frequency of the motor input voltage. The torque of the motor remains constant over a wide range of rotational speeds.

With vacuum pumps it is necessary, depending on the current operating condition of the pump, to adjust the drive characteristics over a wide operational range. However, the possibilities of adjusting the performance data of the drive to the operating condition of the pump are limited in a technical respect, e.g. due to the maximum current the drive converter can provide. The available mains voltage is a limiting factor as well. By a switchover of a motor it is possible under some operating conditions of the pump e.g. to use an existing voltage reserve, when the converter can no longer provide additional current. This additional power requirement primarily occurs in the event of large pressure or temperature variations, as well as in dependence on the media conveyed. Further, the necessity for a reduction of the motor current may arise when media at a high temperature get into the pump and the pump rotor has to be thermally relieved. Also when explosive media are introduced, it is necessary to change the operating point and to thereby reduce the rotor temperature.

DE 10 2013 009 036 A1 describes a drive unit for a shredding device with a star-delta switchover motor and a drive converter for regulating or controlling a physical quantity of the motor. The star-delta switchover is effected by a control unit with consideration to at least one quantity detected in the drive unit.

It is an object of the present disclosure to provide a vacuum pump drive and a corresponding method for an adjustment of the characteristic of the driving electric motor within the vacuum pump in case of varying operational data.

SUMMARY

According to the disclosure a control means, e.g. an electronic control device, is electrically and/or optically connected with a switchover means and a measuring device. The switchover means comprises at least one electric switch and is configured to connect the motor windings in a star or a delta shape depending on the position of the switch. The measuring device is provided with sensors for detecting physical operating parameters of the vacuum pump, such as, for example, the pump temperature, the vacuum pump pressure and/or the rotational speed of the vacuum pump. The control means is configured to effect an actuation of the switch of the switchover means in dependence on the measured operating quantities off the vacuum pump to thereby achieve a star-delta switchover of the motor windings in dependence on the measured value of the operating parameter.

Switchover is effected automatically, i.e. e.g. as soon as a predefined limit value for the relevant operating parameter is exceeded or undershot. This is detected automatically by the control means by continuously measuring and monitoring the relevant operating parameter, i.e. by comparing it to at least one limit value. As soon as the limit value is exceeded or undershot, switchover is effected automatically.

The switchover from the star connection to the delta connection or from the delta connection to the star connection of the motor windings causes a change in the motor characteristic curve of motor voltage and motor current. For example, in dependence on the rotational speed, the star connection may be selected for the operating condition of a start-up or in the event of pressure variations. Here, the motor is operated at a higher voltage and a lower current, which in turn results in a reduction of power loss in the motor, in particular in the pump rotor. When a certain rotational speed is exceeded or the pressure drops below a certain pressure, a switchover to the delta connection would be effected so as to have sufficient power reserve for the further acceleration of the vacuum pump at a lower pressure.

A star connection is also understood in particular as a double star connection. Analogously, a delta connection is also understood in particular as a double delta connection.

The drive for a shredding device described in DE 10 2013 009 056 A1 merely considers one physical quantity of the motor detected in the drive unit. In contrast thereto, the disclosure provides for the detection of at least one operating parameter of the vacuum pump such as e.g. the vacuum pump pressure, the temperature and/or the rotational speed, and to effect the star-delta switchover automatically in dependence on this operating parameter. Thus, the detection does not just concern physical quantities of the motor such as the motor voltage, the intermediate circuit current or the temperature of components of the drive current converter. By detecting and monitoring at least one operating parameter of the vacuum pump, it is possible to obtain the decisive advantage of a direct and immediate detection of a changed operating condition of the vacuum pump and of an automatic adjustment of the motor characteristic. Thereby, the adjustment of the torque is safer, more reliable and faster.

In a vacuum pump drive the determining operating parameters are not exclusively found inside the drive unit, but primarily exist inside the vacuum pump driven by the drive unit.

Therefore, it is necessary to change over the star-delta switchover not exclusively on the basis of data determined inside the drive unit, but to use the operating data of the vacuum pump as the basis for a switchover, e.g. data such as the gas pressure, the gas composition or the gas temperature.

These operating data depend, e.g., on the type and the state of the gases to be conveyed, whereby it is possible to automatically adjust the motor characteristic to different types of gas (e.g., hydrogen, helium, argon etc.) and/or in dependence on their temperature. These cannot be detected inside the drive unit. Instead, the operating data have to be used as determining quantities directly in the pump.

Thus, in the switchover described in DE 10 2013 009 038 A1 only the operating data of the drive unit are decisive for a switchover, whereas in the method described herein, the operating data inside the driven vacuum pump are primarily decisive for the switchover.

BRIEF DESCRIPTION OF THE DRAWINGS

An embodiment of the disclosure will be explained in detail hereunder with reference to the FIGURE. The FIGURE is a schematic illustration of the embodiment.

DETAILED DESCRIPTION OF THE PREFERRED EMBODIMENT

The vacuum pump 13 of the embodiment comprises a pump rotor 14 which, for the purpose of torque transmission, is mechanically connected with an electric motor 18 of the vacuum pump drive 12 via a drive shaft 16. A frequency converter 20 supplies the electric motor 18 with three-phase alternating voltage as the motor input voltage. The frequency converter 20 generates the motor input voltage from a mains supply voltage not illustrated in the FIGURE.

A switchover means 22 comprises two electric switches 24, 26, respectively acting on exactly one phase of the three-phase electric connecting line 28 between the frequency converter 20 and the electric motor 18. Depending on the position of the two electric switches 24, 26, the windings of the drive motor are connected in star or a delta configuration. Seen in the energy flow direction from the voltage supply network and in the direction of the electric motor 18, the switchover means 22 is thus arranged between the frequency converter 20 and the electric motor 18 and acts there on the electric connecting line 28 between the frequency converter 20 and the electric motor 18.

A control means 30 is electrically or optically connected with the switches 24, 26. The control means 30 is further electrically or optically connected with a measuring device 32. The measuring device 32 is provided with sensors 33 that each measure an operating parameter of the vacuum pump 13, e.g. the temperature or the rotational speed of the pump rotor 14 or the pressure generated by the pump rotor 14. The measured values of the respective detected operating parameter are transmitted from the measuring device 32 to the control means 30.

The control means 30 continuously monitors the measured operating parameters by comparing them to stored reference values and/or limit values. When a critical value is exceeded or undershot, the control means 30 is configured to actuate the switches 24, 26 so that a change of the operating condition of the vacuum pump 12 is detected automatically from the operating parameter and the motor characteristic is changed from a star connection to a delta connection or from a delta connection to a star connection by a switchover of the motor windings.

Due to the switchover according to the present disclosure the electric drive motor 18 can be changed over automatically between two motor characteristics when the operating conditions of the vacuum pump 13 change. This allows for an optimal design of the drive train and thus for an increase in drive power with the same structural size of the vacuum pump 12 or for a reduction in component size with the drive power remaining the same.

What is claimed is:

1. A vacuum pump drive, comprising:
   a rotor of a vacuum pump;
   an electric motor connected with the rotor via a drive shaft, the motor having motor windings;
   a frequency converter electrically connected with the motor and supplying the motor with a motor input voltage;
   a switchover device with an electric switch, the switchover device being configured to connect the motor windings in dependence on a switching position of the switch in a star connection or a delta connection;
   a measuring device with a plurality of sensors for the detection of physical operating parameters of the vacuum pump as measured values, wherein each sensor of the plurality of sensors measures an operating parameter, wherein the operating parameters are selected from a group consisting of a temperature of the vacuum pump, an internal pressure of the vacuum pump, and a speed of the vacuum pump; and
   a controller electrically or optically connected with the switchover device and the measuring device and configured to actuate the electric switch in dependence on the measured values of the operating parameter of the temperature of the vacuum pump, or the internal pressure of the vacuum pump so as to effect a switchover of the switchover device between the star connection and the delta connection.

2. A method for driving a vacuum pump with a vacuum pump drive, comprising:
   a rotor of the vacuum pump,
   an electric motor connected with the rotor of the vacuum pump via a drive shaft,
   a frequency converter electrically connected with windings of the electric motor and supplying the electric motor with a motor input voltage,
   a switchover device with at least one electric switch, the switchover device being configured to connect the motor windings in a star connection or a delta connection, depending on a position of the at least one electric switch, in order to change a characteristic of the electric motor,
   a measuring device with a plurality of sensors for the detection of multiple physical operating parameters of the vacuum pump, where the multiple physical operating parameters are selected from a group consisting of a temperature of the vacuum pump, an internal pressure of the vacuum pump, and a rotational speed of the vacuum pump, and
   a controller electrically or optically connected with the switchover device and the measuring device, the controller being configured to actuate the at least one electric switch in dependence on the measured value of the temperature of the vacuum pump, or the internal pressure of the vacuum pump, so as to effect the position of the at least one electric switch in the star-delta switchover device, wherein
   the electric motor drives the drive shaft of the vacuum pump rotor, the frequency converter supplies a motor input voltage to the windings of the electric motor, and the controller actuates the at least one electric switch of the switchover device so that the motor windings of the electric motor are connected in the star connection or the delta connection depending on the position of the at least one electric switch, to thereby change the characteristic of the electric motor.

3. The method of claim 2, wherein the controller switches the frequency converter and/or the electric motor from a first motor characteristic to a second motor characteristic when a limit value of the temperature of the vacuum pump, or the internal pressure of the vacuum pump is exceeded.

4. The method of claim 2, wherein the controller is configured to change between two torque characteristics of the electric motor when the at least one electric switch is actuated.

\* \* \* \* \*